US012785239B2

(12) United States Patent
Do

(10) Patent No.: US 12,785,239 B2
(45) Date of Patent: Nov. 3, 2026

(54) DEVICE FOR TRANSMITTING RF (RADIO FREQUENCY) SIGNAL

(71) Applicant: HL KLEMOVE CORPORATION, Incheon (KR)

(72) Inventor: Han-Ju Do, Incheon (KR)

(73) Assignee: HL KLEMOVE CORPORATION, Incheon (KR)

( * ) Notice: Subject to any disclaimer, the term of this patent is extended or adjusted under 35 U.S.C. 154(b) by 92 days.

(21) Appl. No.: 18/954,762

(22) Filed: Nov. 21, 2024

(65) Prior Publication Data

US 2025/0343342 A1 Nov. 6, 2025

(30) Foreign Application Priority Data

May 3, 2024 (KR) ........................ 10-2024-0059393

(51) Int. Cl.
*H01P 3/12* (2006.01)
*H01P 3/123* (2006.01)

(52) U.S. Cl.
CPC .................................... *H01P 3/123* (2013.01)

(58) Field of Classification Search
CPC .......... H01P 1/065; H01P 5/082; H01P 1/173; H01P 1/165; H01P 1/022; Y10T 29/49016
See application file for complete search history.

(56) References Cited

U.S. PATENT DOCUMENTS 2,975,383 A 3/1961 Theodore
6,995,628 B2 * 2/2006 Asao ....................... H01P 1/025 343/756
7,212,087 B2 * 5/2007 Nagai ..................... H01P 1/022 343/756
2004/0246062 A1 12/2004 Asao et al.
2012/0039566 A1 * 2/2012 Ruiz Cruz .............. H01P 5/024 385/28

FOREIGN PATENT DOCUMENTS

CN 105633516 A * 6/2016 .............. H01P 1/161
CN 106299572 A * 1/2017 ................ H01P 5/02
CN 212485516 U 2/2021

(Continued)

*Primary Examiner* — Quan Tra
(74) *Attorney, Agent, or Firm* — Seed Intellectual Property Law Group LLP

(57) ABSTRACT

A device for transmitting an RF signal is disclosed. The device for transmitting an RF signal may include a first waveguide that has a rectangular transverse section with a long side and a short side and extends linearly, and is disposed so that an RF (radio frequency) signal enters one side thereof and the RF signal exits the other side; a second waveguide that has the same shape of transverse section as the transverse section of the first waveguide and extends linearly, and is disposed on the other side of the first waveguide so that the RF signal enters one side thereof and exits the other side, and its transverse section is disposed in a form that crosses the transverse section of the first waveguide; and a conversion tube that extends linearly and has a transverse section with a shape in which two quadrilaterals partially overlap each other, and is disposed between the first waveguide and the second waveguide to connect the first waveguide and the second waveguide.

13 Claims, 8 Drawing Sheets

(56) References Cited

FOREIGN PATENT DOCUMENTS

| | | | | | |
|---|---|---|---|---|---|
| CN | 114421107 | A | | 4/2022 | |
| CN | 116169445 | A | | 5/2023 | |
| CN | 115473022 | B | | 8/2023 | |
| CN | 116598732 | A | * | 8/2023 | ............. H01P 1/022 |
| KR | 20200129526 | A | | 11/2020 | |

* cited by examiner

DEVICE FOR TRANSMITTING RF (RADIO FREQUENCY) SIGNAL

CROSS-REFERENCE TO RELATED APPLICATION

This application claims the benefit of and priority to Korean Patent Application No. 10-2024-0059393, filed on May 3, 2024, which is incorporated by reference herein in its entirety.

BACKGROUND

Technical Field

The present disclosure relates to a device for transmitting radio frequency (RF) signal, and more particularly, to a device for transmitting RF signal that transmits a high-frequency signal used for object detection.

Description of Related Art

In recent years, vehicle antennas are developing into waveguide structures. Accordingly, RF (Radio Frequency) output technology of chipsets is also developing into direct feeding using waveguide structures.

The chip output of the direct feeding structure is arranged in two directions: the E-plane and the H-plane. Since waveguide type antennas are generally designed in the E-plane, the H-plane output needs to be converted to the E-plane.

In the past, methods such as bending the direction of propagation of RF signals and designing waveguides by twisting them into a screw shape were used to achieve conversion between the E-plane and the H-plane.

BRIEF SUMMARY

The present disclosure aims to solve the above problems, and the present disclosure is directed to providing a device for transmitting an RF (radio frequency) signal capable of achieving conversion between an E-plane and an H-plane without bending the traveling direction of the RF signal.

The present disclosure is also directed to providing a device for transmitting an RF signal in which manufacturing is efficient because a curved path is not included.

The objects of the present disclosure are not limited to the above-described objects, and other objects that are not mentioned will be able to be clearly understood by those skilled in the art to which the present disclosure pertains from the following description.

According to an aspect of the present disclosure, provided is a device for transmitting an RF (radio frequency) signal, including a first waveguide that has a rectangular transverse section with a long side and a short side and extends linearly, and is disposed so that an RF (radio frequency) signal enters one side thereof and the RF signal exits the other side; a second waveguide that has the same shape of transverse section as the transverse section of the first waveguide and extends linearly, and is disposed on the other side of the first waveguide so that the RF signal enters one side thereof and exits the other side, and its transverse section is disposed in a form that crosses the transverse section of the first waveguide; and a conversion tube that extends linearly and has a transverse section with a shape in which two quadrilaterals partially overlap each other, and is disposed between the first waveguide and the second waveguide to connect the first waveguide and the second waveguide, wherein when the RF signal has an H-plane, it passes through the conversion tube and is converted into an E-plane, and when the RF signal has an E-plane, it passes through the conversion tube and is converted into an H-plane.

In the device for transmitting an RF signal according to an aspect of the present disclosure, the transverse section of the conversion tube may have a shape in which two squares has a length of one side shorter than that of the long side of the rectangle partially overlap each other.

In the device for transmitting an RF signal according to an aspect of the present disclosure, the transverse section of the conversion tube may have a shape in which the two squares are partially overlapped in a diagonal direction.

In the device for transmitting an RF signal according to an aspect of the present disclosure, when the transverse section of the first waveguide, the transverse section of the second waveguide, and the transverse section of the conversion tube are arranged on the same plane, a circumscribed quadrilateral circumscribed by the transverse section of the first waveguide and the transverse section of the second waveguide may be also circumscribed by the transverse section of the conversion tube.

In the device for transmitting an RF signal according to an aspect of the present disclosure, the transverse section of the conversion tube may be arranged to occupy the remaining region except for two corners facing diagonally within the circumscribed quadrilateral.

In the device for transmitting an RF signal according to an aspect of the present disclosure, the transverse section of the first waveguide and the transverse section of the second waveguide may be arranged within the circumscribed quadrilateral, occupying a portion of each of two corners not occupied by the transverse section of the conversion tube.

In the device for transmitting an RF signal according to an aspect of the present disclosure, in the two corners not occupied by the transverse section of the conversion tube within the circumscribed quadrilateral, a non-occupied region not occupied by the transverse section of the first waveguide and the transverse section of the second waveguide may be formed in a square shape.

In the device for transmitting an RF signal according to an aspect of the present disclosure, the length of one side of the square may have a length of 62 to 64% of the length of the long side of the rectangle.

In the device for transmitting an RF signal according to an aspect of the present disclosure, the length in the extension direction of the conversion tube may have a length of 84 to 124% compared to a predetermined design dimension.

In the device for transmitting an RF signal according to an aspect of the present disclosure, the length of one side of the square may have a length of 61 to 63% of the length of the long side of the rectangle.

In the device for transmitting an RF signal according to an aspect of the present disclosure, the length in the extension direction of the conversion tube may have a length of 80 to 120% compared to a predetermined design dimension.

According to another aspect of the present disclosure, provided is a device for transmitting an RF (radio frequency) signal, including a first waveguide that has a rectangular transverse section with a long side and a short side and extends linearly, and is disposed so that an RF (radio frequency) signal with a frequency band of 76 to 79 GHz enters one side thereof and the RF signal exits the other side; a second waveguide that has the same shape of transverse section as the transverse section of the first waveguide and extends linearly, and is disposed on the other side of the first waveguide so that the RF signal enters one side thereof and exits the other side, and its transverse section is disposed in a form that crosses the transverse section of the first waveguide; and a conversion tube that extends linearly and has a transverse section with a shape in which two quadrilaterals partially overlap each other, and is disposed between the first waveguide and the second waveguide to connect the first waveguide and the second waveguide, wherein when the RF signal has an H-plane, it passes through the conversion tube and is converted into an E-plane, and when the RF signal has an E-plane, it passes through the conversion tube and is converted into an H-plane.

In the device for transmitting an RF signal according to another aspect of the present disclosure, the transverse section of the conversion tube may have a shape in which two squares are partially overlapped in a diagonal direction.

In the device for transmitting an RF signal according to another aspect of the present disclosure, when the transverse section of the first waveguide, the transverse section of the second waveguide, and the transverse section of the conversion tube are arranged on the same plane, a circumscribed quadrilateral circumscribed by the transverse section of the first waveguide and the transverse section of the second waveguide may be also circumscribed by the transverse section of the conversion tube.

In the device for transmitting an RF signal according to another aspect of the present disclosure, the transverse section of the conversion tube may be arranged to occupy the remaining region except for two corners facing diagonally within the circumscribed quadrilateral.

In the device for transmitting an RF signal according to another aspect of the present disclosure, the transverse section of the first waveguide and the transverse section of the second waveguide may be arranged within the circumscribed quadrilateral, occupying a portion of each of two corners not occupied by the transverse section of the conversion tube.

In the device for transmitting an RF signal according to another aspect of the present disclosure, in the two corners not occupied by the transverse section of the conversion tube within the circumscribed quadrilateral, a non-occupied region not occupied by the transverse section of the first waveguide and the transverse section of the second waveguide may be formed in a square shape.

In the device for transmitting an RF signal according to another aspect of the present disclosure, the length of the long side of the rectangle may be 2.54 mm, and the length of one side of the square may be 1.58 to 1.62 mm.

In the device for transmitting an RF signal according to another aspect of the present disclosure, the length in the extension direction of the conversion tube may be 1.05 to 1.55 mm.

In the device for transmitting an RF signal according to another aspect of the present disclosure, the length of the long side of the rectangle may be 3.1 mm, and the length of one side of the square may be 1.91 to 1.95 mm.

In the device for transmitting an RF signal according to another aspect of the present disclosure, the length in the extension direction of the conversion tube may be 1.63 to 2.43 mm.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
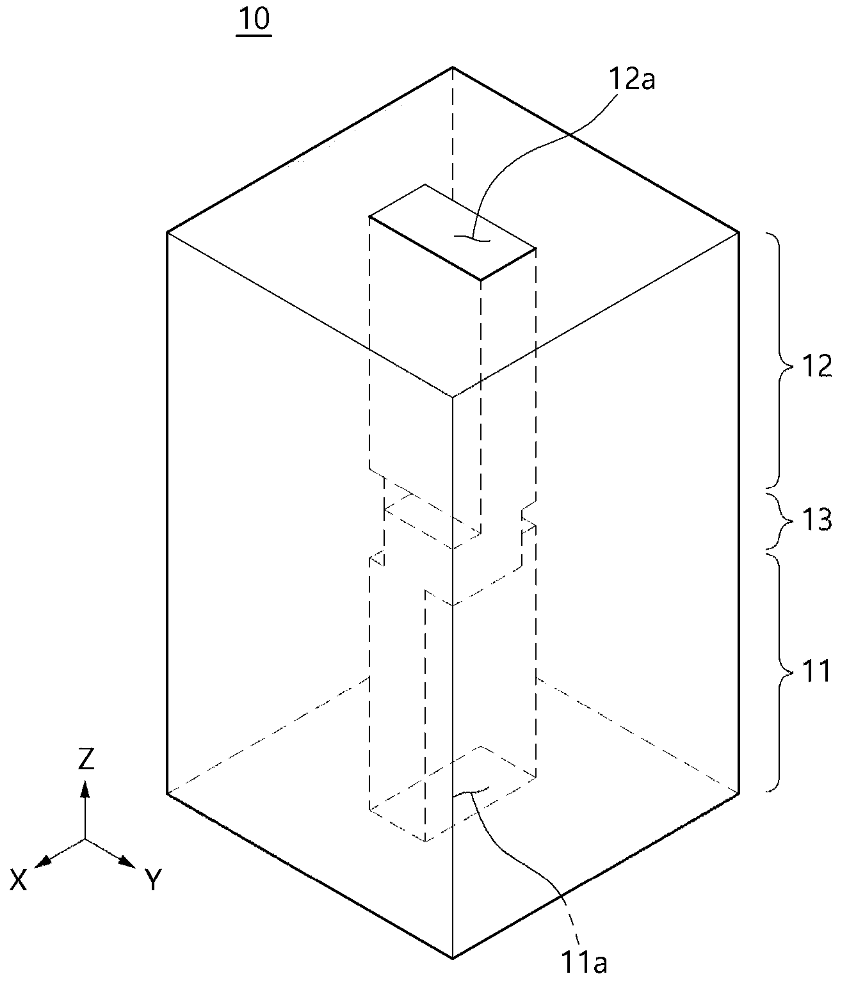
FIG. 1 is a diagram illustrating a configuration of a device for transmitting an RF (radio frequency) signal according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their disclosure.

In the specification, it should be understood that the terms such as “comprise” or “have” are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
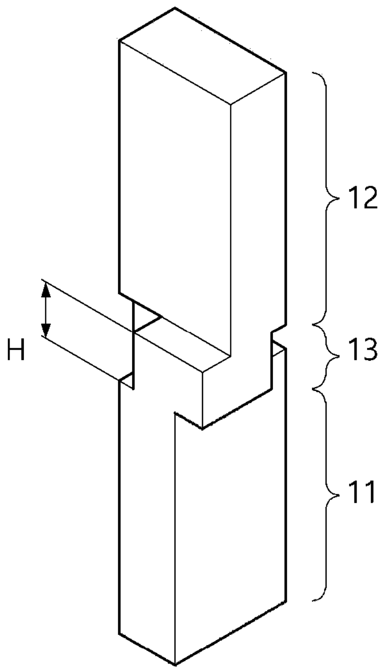
FIG. 2 is a diagram illustrating shapes of signal transmission paths of a first waveguide, a conversion tube, and a second waveguide of a device for transmitting an RF (radio frequency) signal according to an exemplary embodiment of the present disclosure.
Figure 3:
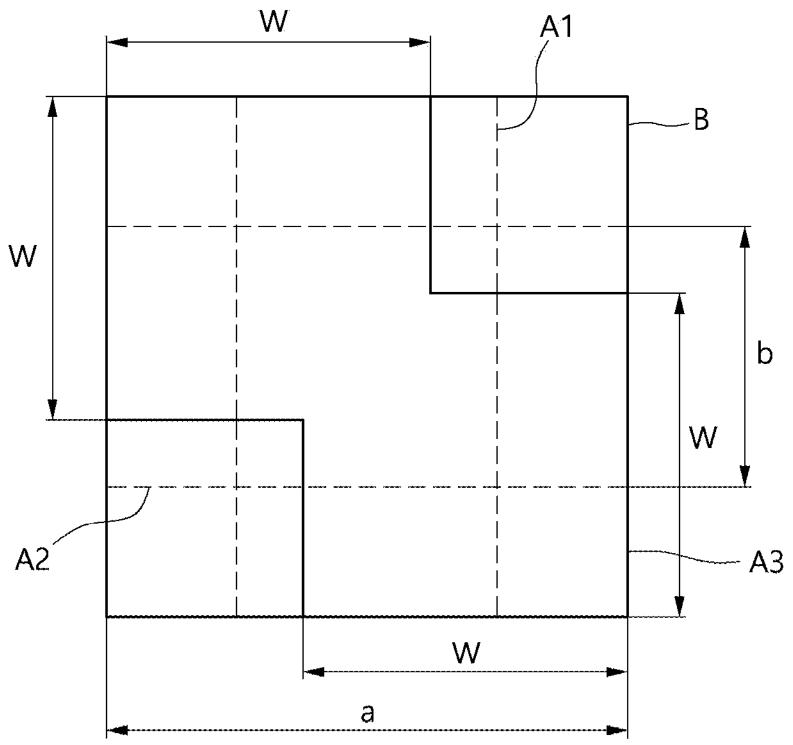
FIG. 3 is a diagram illustrating a transverse section of a first waveguide, a transverse section of a second waveguide, a transverse section of a conversion tube, and a quadrilateral circumscribed thereto of a second waveguide of a device for transmitting an RF (radio frequency) signal according to an exemplary embodiment of the present disclosure.

FIG. 1 is a diagram illustrating a configuration of a device for transmitting an RF (radio frequency) signal according to an exemplary embodiment of the present disclosure, and FIG. 2 is a diagram illustrating shapes of signal transmission paths of a first waveguide, a conversion tube, and a second waveguide of a device for transmitting an RF (radio frequency) signal according to an exemplary embodiment of the present disclosure. FIG. 3 is a diagram illustrating a transverse section of a first waveguide, a transverse section of a second waveguide, a transverse section of a conversion tube, and a quadrilateral circumscribed thereto of a second waveguide of a device for transmitting an RF (radio frequency) signal according to an exemplary embodiment of the present disclosure.

The device 10 for transmitting an RF (radio frequency) signal according to an exemplary embodiment of the present disclosure transmits a signal of a high frequency of microwave or higher. The device 10 for transmitting an RF (radio frequency) signal according to an exemplary embodiment of the present disclosure may be disposed and used in a vehicle antenna.

More specifically, the device 10 for transmitting RF signal may directly receive RF signals output from a chipset and transmit them to a transmitting antenna (not shown). In addition, the device 10 for transmitting RF signal may transmit the RF signals transmitted from the transmitting antenna, and then reflected and returned from an external object, and received by a receiving antenna (not shown) to the chipset.

The device 10 for transmitting an RF signal according to an exemplary embodiment of the present disclosure may convert an RF signal input in the H-plane into the E-plane in the transmission process and output it. The device 10 for transmitting an RF signal according to an exemplary embodiment of the present disclosure may convert an RF signal input in the E-plane into the H-plane during the transmission process and output it.

Since waveguide type antennas are generally designed in the E-plane, the H-plane output during the chipset output needs to be converted to the E-plane during the transmission process. The device 10 for transmitting an RF signal according to an exemplary embodiment of the present disclosure may convert the RF signal output from the chipset in the H-plane to the E-plane through an effective path without a curved or bent section and output the converted RF signal.

Referring to FIGS. 1 to 3, the device 10 for transmitting an RF signal according to an exemplary embodiment of the present disclosure includes a first waveguide 11, a second waveguide 12, and a conversion tube 13.

The first waveguide 11 has a rectangular transverse section having a long side and a short side and extends linearly, and is disposed so that an RF signal enters one side thereof and the RF signal exits the other side.

The first waveguide 11 has an entrance/exit 11*a* on one side thereof. For example, a chipset that outputs the RF signal may be placed on the entrance/exit 11*a* of the first waveguide 11, and the RF signal output by the chipset may enter the inside of the first waveguide 11 through the entrance/exit 11*a* of the first waveguide 11. The RF signal may enter the first waveguide 11 and then proceed along the extension direction of the first waveguide 11 toward the second waveguide 12.

The first waveguide 11 may be made of a conductor. The inside of the first waveguide 11 is made of an empty space. The shape of the empty space formed inside the first waveguide 11 may be defined by the inner surface of the first waveguide 11.

The transverse section A1 of the first waveguide 11 has a rectangular shape having a length of a long side a (a>0) and a length of a short side b (b>0).

In an embodiment of the present disclosure, the transverse section A1 of the first waveguide 11 may be designed as follows.

When the RF signal is 76 to 79 GHZ (for example, 76.5 GHZ) and according to the waveguide WR-10 standard, the length of the long side of the transverse section A1 of the first waveguide 11 may be set to 2.54 mm, and the length of the short side of the transverse section A1 of the first waveguide 11 may be set to 1.27 mm.

When the RF signal is 76 to 79 GHz (for example, 76.5 GHZ) and according to the waveguide WR-12 standard, the length of the long side of the transverse section A1 of the first waveguide 11 may be set to 3.1 mm, and the length of the short side of the transverse section A1 of the first waveguide 11 may be set to 1.5 mm.

The second waveguide 12 has the same shape of transverse section as the transverse section of the first waveguide 11 and extends linearly. In addition, the second waveguide 12 is disposed on the other side of the first waveguide 11 so that the RF signal enters one side thereof and exits the other side, and its transverse section is disposed in a form that crosses the transverse section of the first waveguide 11.

The second waveguide 12 has an entrance/exit 12*a* through which a signal enters and exits on the other side so that an RF signal introduced to one side is output. For example, the RF signal may be introduced into the first waveguide 11 through the entrance/exit 11*a* of the first waveguide 11, then be introduced into the second waveguide 12 through the conversion tube 13, and then output through the entrance/exit 12*a* of the second waveguide 12.

The second waveguide 12 may be made of a conductor. The inside of the second waveguide 12 is made of an empty space. The shape of the empty space formed inside the second waveguide 12 may be defined by the inner surface of the second waveguide 12.

The transverse section A2 of the second waveguide 12 has a rectangular shape having a length of a long side a (a>0) and a length of a short side b (b>0). In other words, the transverse section A2 of the second waveguide 12 has the same shape as the transverse section A1 of the first waveguide 11.

The transverse section A2 of the second waveguide 12 is disposed to cross the transverse section A1 of the first waveguide 11. In more detail, the transverse section A2 of the second waveguide 12 may be disposed to cross the center of the transverse section A1 of the first waveguide 11.

In an embodiment of the present disclosure, the transverse section A2 of the second waveguide 12 may be designed as follows.

When the RF signal is 76 to 79 GHz (for example, 76.5 GHZ) and according to the waveguide WR-10 standard, the length of the long side of the transverse section A2 of the second waveguide 12 may be set to 2.54 mm, and the length of the short side of the transverse section A2 of the second waveguide 12 may be set to 1.27 mm.

When the RF signal is 76 to 79 GHz (for example, 76.5 GHZ) and according to the waveguide WR-12 standard, the length of the long side of the transverse section A2 of the second waveguide 12 may be set to 3.1 mm, and the length of the short side of the transverse section A2 of the second waveguide 12 may be set to 1.5 mm.

The conversion tube 13 extends linearly and has a transverse section with a shape in which two quadrilaterals partially overlap each other, and is disposed between the first waveguide 11 and the second waveguide 12 to connect the first waveguide 11 and the second waveguide 12.

The conversion tube 13 may be made of a conductor. The inside of the conversion tube 13 is made of an empty space. The shape of the empty space formed inside the conversion tube 13 may be defined by the inner surface of the conversion tube 13.

The conversion tube 13 converts a plane of the RF signal. In more detail, when the RF signal has an H-plane, it passes through the conversion tube 13 and is converted into an E-plane. In more detail, when the RF signal has an E-plane, it passes through the conversion tube 13 and is converted into an H-plane.

The transverse section A3 of the conversion tube 13 may have a shape in which two squares having a length of one side shorter than that of the long side of the rectangle partially overlap each other. In other words, the transverse section A3 of the conversion tube 13 may have a shape in which two squares having a length of one side shorter than a long side of a rectangle forming the transverse section A1 of the first waveguide 11 and the transverse section A2 of the second waveguide 12 partially overlap each other.

In more detail, the transverse section A3 of the conversion tube 13 may have a shape in which the two squares are partially overlapped in a diagonal direction.

Referring to FIG. 3, the length of one side of the square may be defined as the width W of a junction. Meanwhile, referring to FIG. 2, the extension length of the conversion tube 13 may be defined as the height (or length) H of a junction.

Referring to FIG. 3, when the transverse section A1 of the first waveguide 11, the transverse section A2 of the second waveguide 12, and the transverse section A3 of the conversion tube 13 are disposed on the same plane, the circumscribed quadrilateral B circumscribed by the transverse section A1 of the first waveguide 11 and the transverse section A2 of the second waveguide 12 is also circumscribed by the transverse section A3 of the conversion tube 13.

In this case, the transverse section A3 of the conversion tube 13 is arranged to occupy the remaining region except for two corners facing diagonally within the circumscribed quadrilateral B.

In addition, the transverse section A1 of the first waveguide 11 and the transverse section A2 of the second waveguide 12 are arranged within the circumscribed quadrilateral B, occupying a portion of each of two corners not occupied by the transverse section A3 of the conversion tube 13.

Furthermore, in the two corners not occupied by the transverse section A3 of the conversion tube 13 within the circumscribed quadrilateral B, a non-occupied region not occupied by the transverse section A1 of the first waveguide 11 and the transverse section A2 of the second waveguide 12 may be formed in a square shape.

Figure 4:
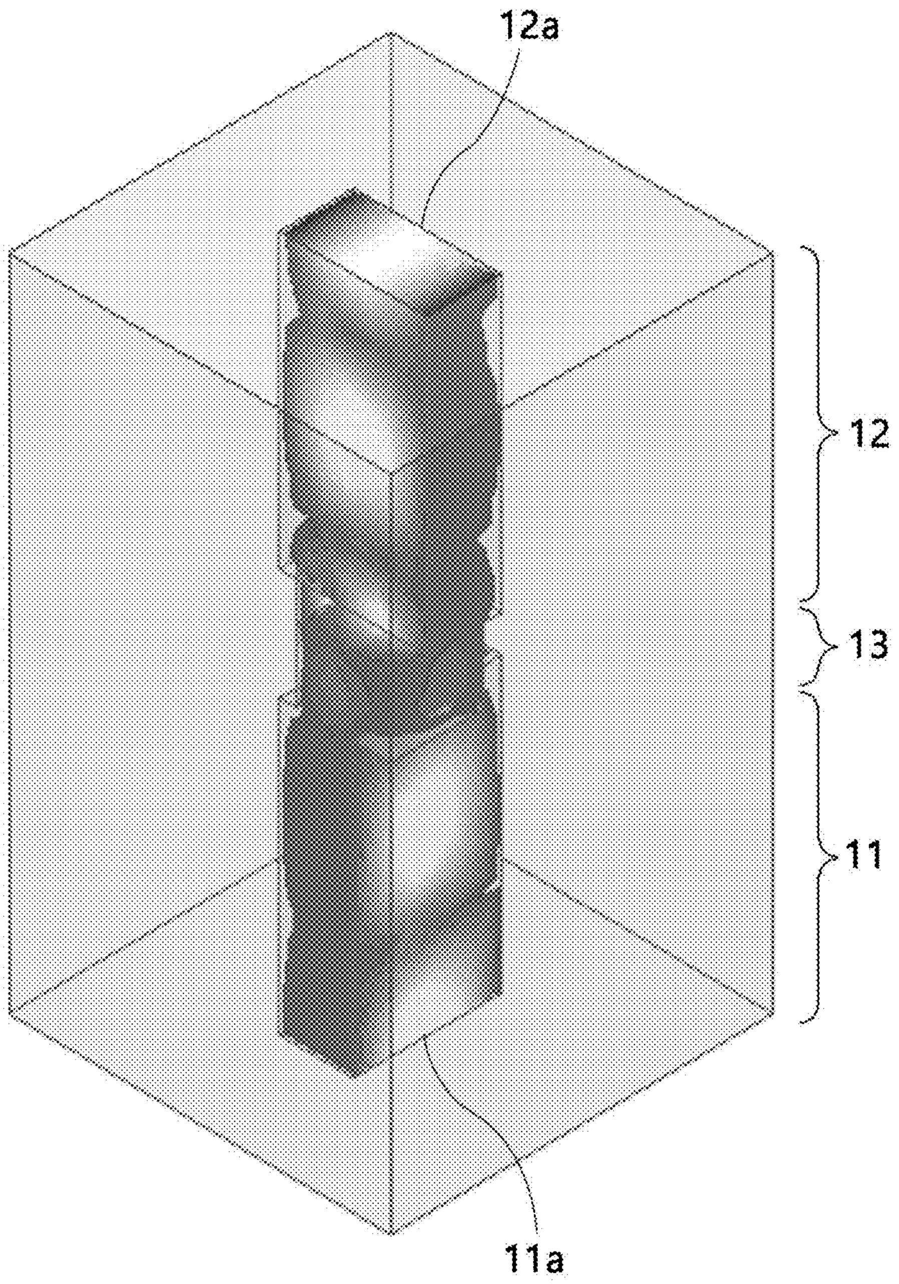
FIG. 4 is a diagram illustrating an operation of a device for transmitting an RF signal according to an exemplary embodiment of the present disclosure.

FIG. 4 is a diagram illustrating an operation of a device for transmitting an RF signal according to an exemplary embodiment of the present disclosure.

Referring to FIG. 4, it can be confirmed that when an RF signal enters the first waveguide 11 through the entrance/exit 11*a* of the first waveguide 11 and passes through the conversion tube 13 while traveling toward the second waveguide 12, the plane of the RF signal is converted. The plane of the RF signal is converted passing through the conversion tube 13 to enter the second waveguide 12, and is output through the entrance/exit 12*a* of the second waveguide 12.

Specifically, when an RF signal input to the first waveguide 11 has an H-plane, it passes through the conversion tube 13 and is converted into an E-plane. Conversely, when an RF signal input to the first waveguide 11 has an E-plane, it passes through the conversion tube 13 and is converted into an H-plane.

Hereinafter, the width W and length (height) H of the junction formed by the conversion tube 13 as defined above will be described in detail.

First, it is assumed that the RF signal is 76.5 GHz and conforms to the waveguide WR-10 standard (hereinafter referred to as the "first design").

In the first design, the lengths of the long sides of the transverse section A1 of the first waveguide 11 and the transverse section A2 of the second waveguide 12 may be set to 2.54 mm, and the lengths of the short sides of the transverse section A1 of the first waveguide 11 and the transverse section A2 of the second waveguide 12 may be set to 1.27 mm.

In the first design, the width W of the junction may be set to 1.60 mm (design dimension).

Figure 5:
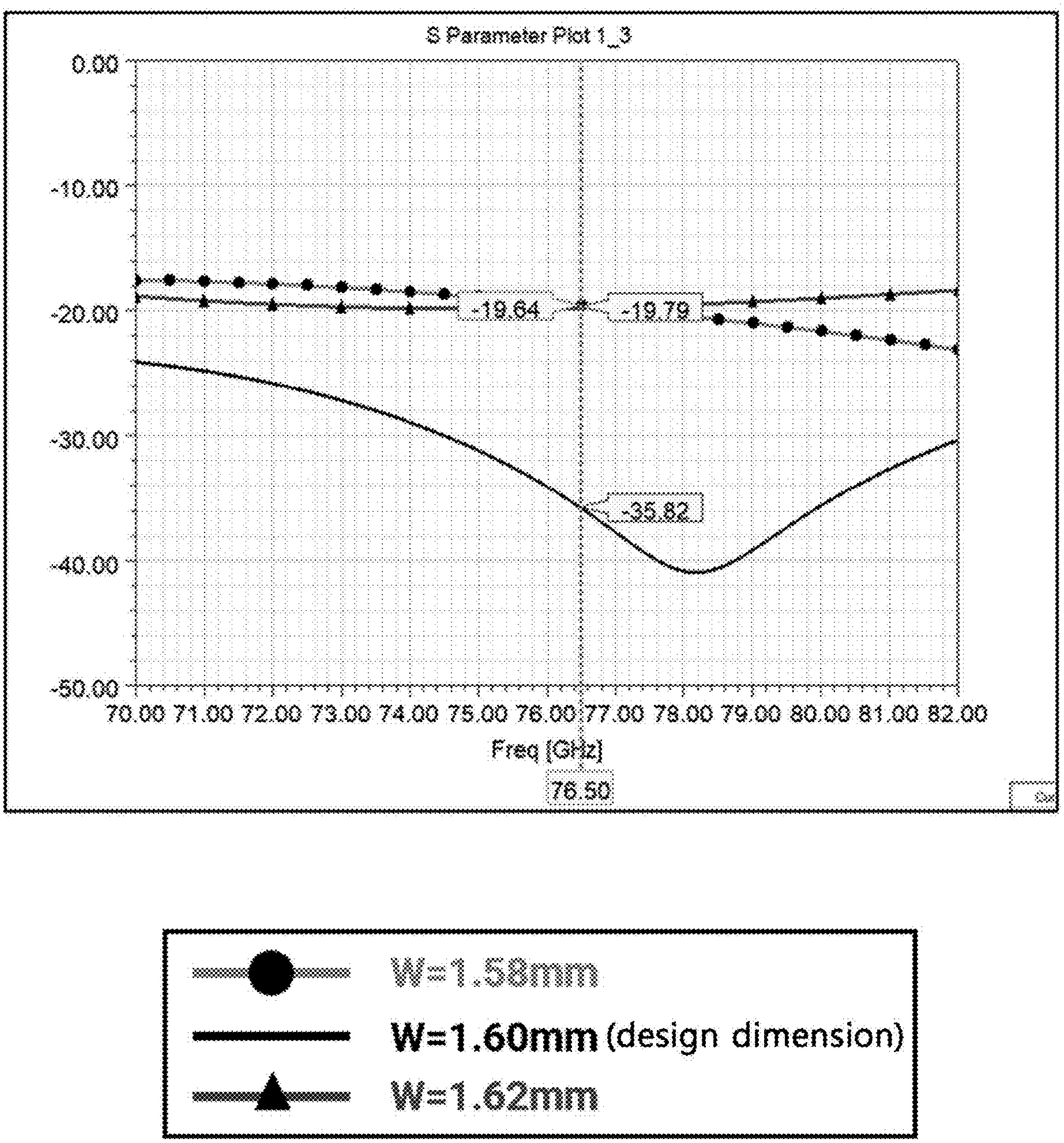
FIG. 5 is a graph illustrating a return loss during the first waveguide input and first waveguide output according to the junction width of the conversion tube when the design frequency of the device for transmitting an RF signal according to an exemplary embodiment of the present disclosure is 76.5 GHz and the dimensions of the transverse sections of the first waveguide and the second waveguide are designed according to the WR-10 standard.

FIG. 5 is a graph illustrating a return loss during the first waveguide input and first waveguide output according to the junction width of the conversion tube when the design frequency of the device for transmitting an RF signal according to an exemplary embodiment of the present disclosure is 76.5 GHz and the dimensions of the transverse sections of the first waveguide and the second waveguide are designed according to the WR-10 standard.

Referring to FIG. 5, when the width W of the junction is 1.60 mm in the first design, the return loss of a signal input to the first waveguide 11 and output through the first waveguide 11 is represented as −35.82 dB.

In addition, when the width W of the junction is 1.58 mm in the first design, the return loss of a signal input to the first waveguide 11 and output through the first waveguide 11 after reflection from the second waveguide 12 is represented as −19.64 dB.

In addition, when the width W of the junction is 1.62 mm in the first design, the return loss of a signal input to the first waveguide 11 and output through the first waveguide 11 after reflection from the second waveguide 12 is represented as −19.79 dB.

Assuming that the device 10 for transmitting an RF signal according to an exemplary embodiment of the present disclosure is applied to a vehicle radar, it is generally considered appropriate that the required return loss is less than or equal to −20 dB.

Considering this point, in the first design, the length of the long side of the rectangle, that is, the long sides of the transverse section A1 of the first waveguide 11 and the transverse section A2 of the second waveguide 12 may be 2.54 mm, and the length of one side of the square, that is, the width W of the junction may be 1.58 to 1.62 mm. In this case, the design dimension, which is the optimum value of the width W of the junction, may be 1.60 mm.

In other words, in the first design, the length of one side of the square, that is, the width W of the junction may have a length of 62 to 64% of the length of the long side of the rectangle, that is, the lengths of the long sides of the transverse section A1 of the first waveguide 11 and the transverse section A2 of the second waveguide 12.

Meanwhile, in the first design, the length H of the junction may be set to 1.25 mm (design dimension).

Figure 6:
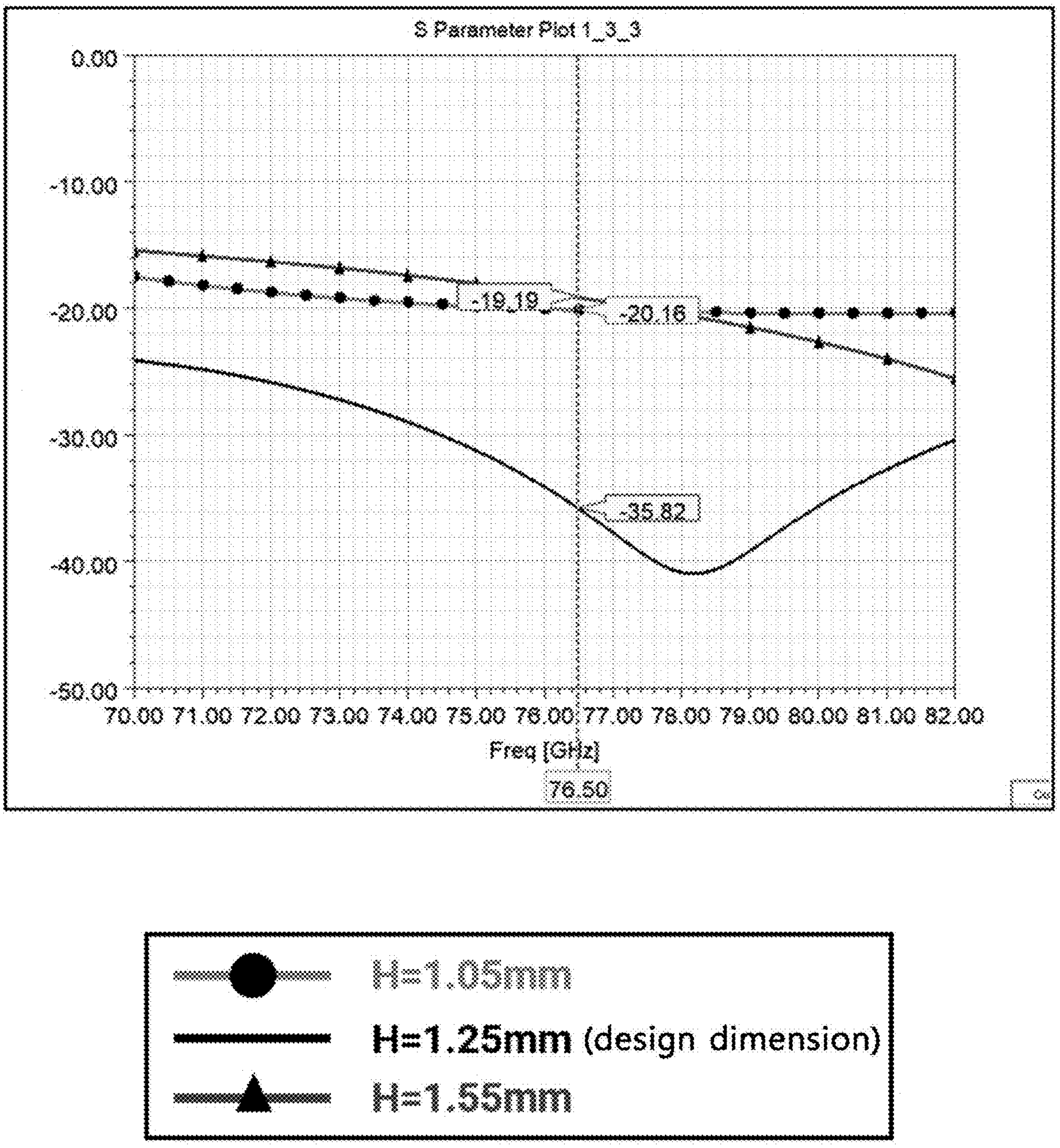
FIG. 6 is a graph illustrating a return loss during the first waveguide input and first waveguide output according to the junction length (height) of the conversion tube when the design frequency of the device for transmitting an RF signal according to an exemplary embodiment of the present disclosure is 76.5 GHz and the dimensions of the transverse sections of the first waveguide and the second waveguide are designed according to the WR-10 standard.

FIG. 6 is a graph illustrating a return loss during the first waveguide input and first waveguide output according to the junction length (height) of the conversion tube when the design frequency of the device for transmitting an RF signal according to an exemplary embodiment of the present disclosure is 76.5 GHz and the dimensions of the transverse sections of the first waveguide and the second waveguide are designed according to the WR-10 standard.

Referring to FIG. 6, when the length H of the junction is 1.25 mm in the first design, the return loss of a signal input to the first waveguide 11 and output through the first waveguide 11 is represented as −35.82 dB.

In addition, when the length H of the junction is 1.05 mm in the first design, the return loss of a signal input to the first waveguide 11 and output through the first waveguide 11 after reflection from the second waveguide 12 is represented as −20.16 dB.

In addition, when the length H of the junction is 1.55 mm in the first design, the return loss of a signal input to the first waveguide 11 and output through the first waveguide 11 after reflection from the second waveguide 12 is represented as −19.19 dB.

Assuming that the device 10 for transmitting an RF signal according to an exemplary embodiment of the present disclosure is applied to a vehicle radar, it is generally considered appropriate that the required return loss is less than or equal to −20 dB.

Considering this point, in the first design, the length in the extension direction of the conversion tube 13 may be 1.05 to 1.55 mm. In this case, the design dimension, which is the optimum value of the length H of the junction, may be 1.25 mm.

In another aspect, in the first design, the length in the extension direction of the conversion tube 13 may have a length of 84 to 124% compared to a predetermined design dimension. That is, the length in the extension direction of the conversion tube 13 may have a tolerance of −16 to 24% compared to a predetermined design dimension.

Next, it is assumed that the RF signal is 76.5 GHz and conforms to the waveguide WR-12 standard (hereinafter referred to as the "second design").

In the second design, the lengths of the long sides of the transverse section A1 of the first waveguide 11 and the transverse section A2 of the second waveguide 12 may be set to 3.1 mm, and the lengths of the short sides of the transverse section A1 of the first waveguide 11 and the transverse section A2 of the second waveguide 12 may be set to 1.5 mm.

In the second design, the width W of the junction may be set to 1.93 mm (design dimension).

Figure 7:
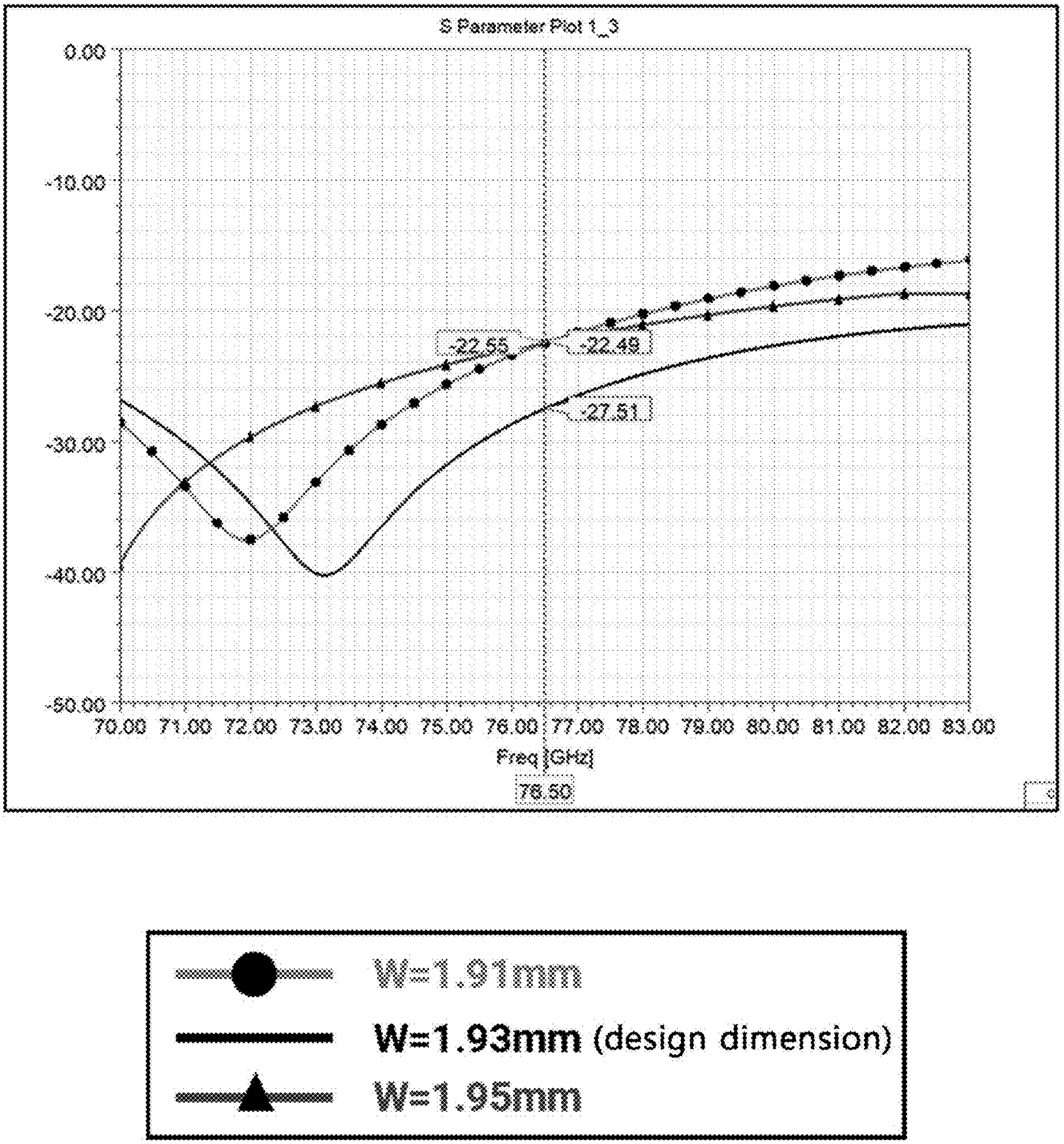
FIG. 7 is a graph illustrating a return loss during the first waveguide input and first waveguide output according to the junction width of the conversion tube when the design frequency of the device for transmitting an RF signal according to an exemplary embodiment of the present disclosure is 76.5 GHZ and the dimensions of the transverse sections of the first waveguide and the second waveguide are designed according to the WR-12 standard.

FIG. 7 is a graph illustrating a return loss during the first waveguide input and first waveguide output according to the junction width of the conversion tube when the design frequency of the device for transmitting an RF signal according to an exemplary embodiment of the present disclosure is 76.5 GHz and the dimensions of the transverse sections of the first waveguide and the second waveguide are designed according to the WR-12 standard.

Referring to FIG. 7, when the width W of the junction is 1.93 mm in the second design, the return loss of a signal input to the first waveguide 11 and output through the first waveguide 11 is represented as −27.51 dB.

In addition, when the width W of the junction is 1.91 mm in the second design, the return loss of a signal input to the first waveguide 11 and output through the first waveguide 11 after reflection from the second waveguide 12 is represented as −22.55 dB.

In addition, when the width W of the junction is 1.95 mm in the second design, the return loss of a signal input to the first waveguide 11 and output through the first waveguide 11 after reflection from the second waveguide 12 is represented as −22.49 dB.

Assuming that the device 10 for transmitting an RF signal according to an exemplary embodiment of the present disclosure is applied to a vehicle radar, it is generally considered appropriate that the required return loss is less than or equal to −20 dB.

Considering this point, in the second design, the length of the long side of the rectangle, that is, the long sides of the transverse section A1 of the first waveguide 11 and the transverse section A2 of the second waveguide 12 may be 3.1 mm, and the length of one side of the square, that is, the width W of the junction may be 1.91 to 1.95 mm. In this case, the design dimension, which is the optimum value of the width W of the junction, may be 1.93 mm.

In other words, in the first design, the length of one side of the square, that is, the width W of the junction may have a length of 61 to 63% of the length of the long side of the rectangle, that is, the lengths of the long sides of the transverse section A1 of the first waveguide 11 and the transverse section A2 of the second waveguide 12.

In the second design, the length H of the junction may be set to 2.03 mm (design dimension).

Figure 8:
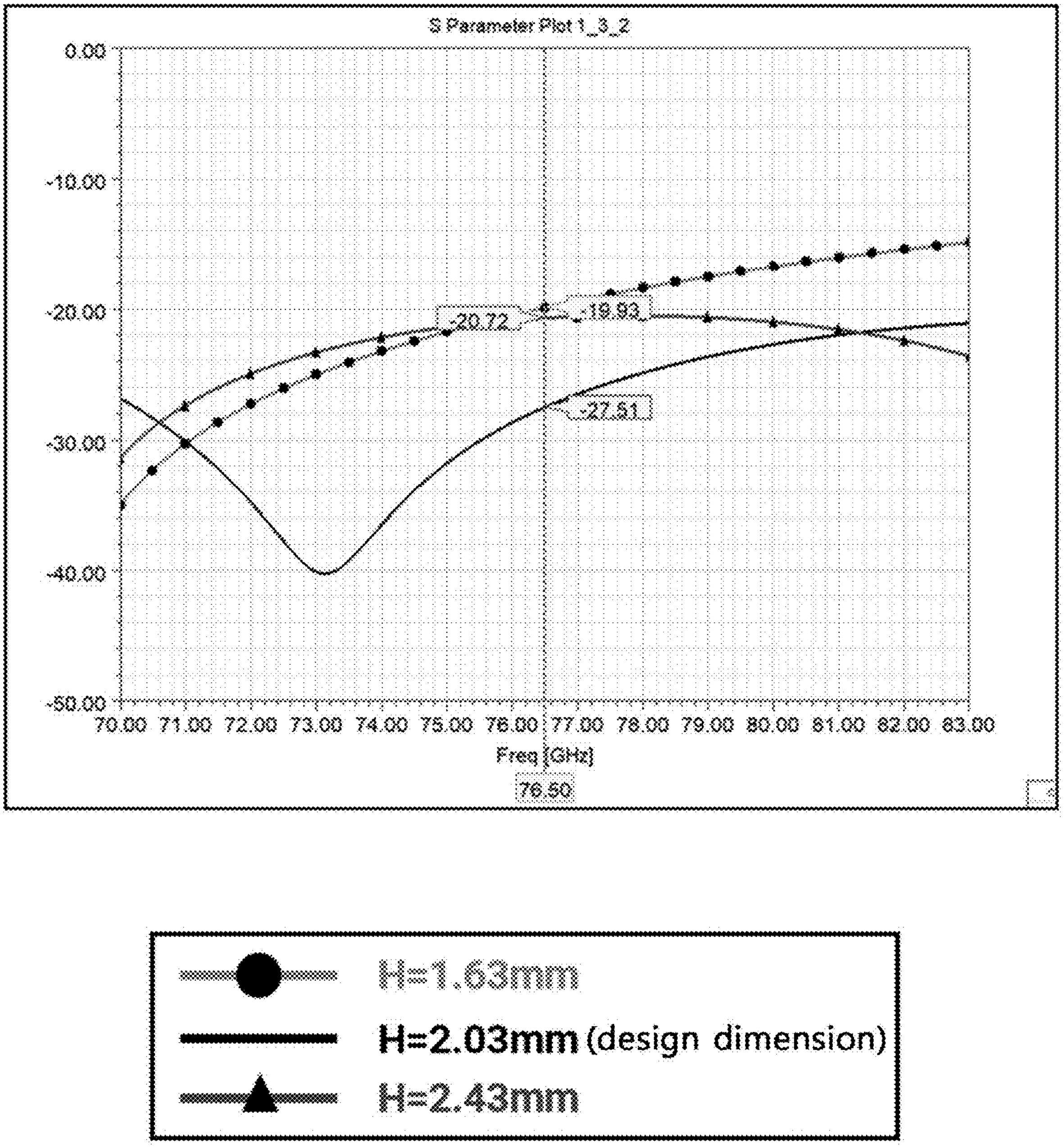
FIG. 8 is a graph illustrating a return loss during the first waveguide input and first waveguide output according to the junction length (height) of the conversion tube when the design frequency of the device for transmitting an RF signal according to an exemplary embodiment of the present disclosure is 76.5 GHz and the dimensions of the transverse sections of the first waveguide and the second waveguide are designed according to the WR-12 standard.

FIG. 8 is a graph illustrating a return loss during the first waveguide input and first waveguide output according to the junction length (height) of the conversion tube when the design frequency of the device for transmitting an RF signal according to an exemplary embodiment of the present disclosure is 76.5 GHz and the dimensions of the transverse sections of the first waveguide and the second waveguide are designed according to the WR-12 standard.

Referring to FIG. 8, when the length H of the junction is 2.03 mm in the second design, the return loss of a signal input to the first waveguide 11 and output through the first waveguide 11 after reflection from the second waveguide 12 is represented as −27.51 dB.

In addition, when the length H of the junction is 1.63 mm in the second design, the return loss of a signal input to the first waveguide 11 and output through the first waveguide 11 is represented as −19.93 dB.

In addition, when the length H of the junction is 2.43 mm in the second design, the return loss of a signal input to the first waveguide 11 and output through the first waveguide 11 after reflection from the second waveguide 12 is represented as −20.72 dB.

Assuming that the device 10 for transmitting an RF signal according to an exemplary embodiment of the present disclosure is applied to a vehicle radar, it is generally considered appropriate that the required return loss is less than or equal to −20 dB.

Considering this point, in the second design, the length in the extension direction of the conversion tube 13 may be 1.63 to 2.43 mm.

In another aspect, in the second design, the length in the extension direction of the conversion tube 13 may have a length of 80 to 120% compared to a predetermined design dimension. That is, the length in the extension direction of the conversion tube 13 may have a tolerance of ±20% compared to a predetermined design dimension.

As discussed above, according to the present disclosure, when the RF signal output from the chipset of the vehicle antenna is directly fed through the waveguide structure, the conversion between the E-plane and the H-plane can be achieved without warping or bending the waveguide path.

Accordingly, when the waveguide type antenna is designed as an E-plane, it may be efficient to convert the output of the H-plane to the E-plane during the chip outputs arranged in two directions: the E-plane and the H-plane.

In addition, according to the present disclosure, the extension length of the waveguide path can be shortened, and the waveguide path can be configured in a straight line, thereby improving manufacturing efficiency.

According to the above configuration, the device for transmitting an RF (radio frequency) signal according to an aspect of the present disclosure suppresses the extension of the line length by enabling conversion between the E-plane and the H-plane within a conversion tube connecting the RF signal transmission path in a straight line.

In addition, the device for transmitting an RF signal according to an aspect of the present disclosure does not include a curved section on the transmission path of the signal, providing efficiency in manufacturing.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

The invention claimed is:

1. A device for transmitting an RF (radio frequency) signal, comprising:

a first waveguide that has a rectangular transverse section with a long side and a short side and extends linearly, and is disposed so that an RF (radio frequency) signal enters one side thereof and the RF signal exits the other side;

a second waveguide that has the same shape of transverse section as the transverse section of the first waveguide and extends linearly, and is disposed on the other side of the first waveguide so that the RF signal enters one side thereof and exits the other side, and its transverse section is disposed in a form that crosses the transverse section of the first waveguide; and a conversion tube that extends linearly and has a transverse section with a shape in which two quadrilaterals partially overlap each other, and is disposed between the first waveguide and the second waveguide to connect the first waveguide and the second waveguide, wherein when the transverse section of the first waveguide, the transverse section of the second waveguide, and the transverse section of the conversion tube are arranged on the same plane, a quadrilateral formed by the transverse section of the first waveguide and the transverse section of the second waveguide is also formed by the transverse section of the conversion tube, wherein the transverse section of the conversion tube is arranged to occupy a full region except for two corners facing diagonally within the quadrilateral, and wherein when the RF signal has an H-plane, it passes through the conversion tube and is converted into an E-plane, and when the RF signal has an E-plane, it passes through the conversion tube and is converted into an H-plane.

2. The device for transmitting an RF signal of claim 1, wherein the transverse section of the conversion tube has a shape in which two squares having a length of one side shorter than that of the long side of the rectangle partially overlap each other.

3. The device for transmitting an RF signal of claim 2, wherein the transverse section of the conversion tube has a shape in which the two squares are partially overlapped in a diagonal direction.

4. The device for transmitting an RF signal of claim 1, wherein the transverse section of the first waveguide and the transverse section of the second waveguide are arranged within the quadrilateral, occupying a portion of each of two corners not occupied by the transverse section of the conversion tube.

5. The device for transmitting an RF signal of claim 4, wherein in the two corners not occupied by the transverse section of the conversion tube within the quadrilateral, a non-occupied region not occupied by the transverse section of the first waveguide and the transverse section of the second waveguide is formed in a square shape.

6. A device for transmitting an RF (radio frequency) signal, comprising:

a first waveguide that has a rectangular transverse section with a long side and a short side and extends linearly, and is disposed so that an RF (radio frequency) signal with a frequency band of 76 to 79 GHz enters one side thereof and the RF signal exits the other side;

a second waveguide that has the same shape of transverse section as the transverse section of the first waveguide and extends linearly, and is disposed on the other side of the first waveguide so that the RF signal enters one side thereof and exits the other side, and its transverse section is disposed in a form that crosses the transverse section of the first waveguide; and a conversion tube that extends linearly and has a transverse section with a shape in which two quadrilaterals partially overlap each other, and is disposed between the first waveguide and the second waveguide to connect the first waveguide and the second waveguide, wherein when the transverse section of the first waveguide, the transverse section of the second waveguide, and the transverse section of the conversion tube are arranged on the same plane, a quadrilateral formed by the transverse section of the first waveguide and the transverse section of the second waveguide is also formed by the transverse section of the conversion tube, wherein the transverse section of the conversion tube is arranged to occupy a full region except for two corners facing diagonally within the quadrilateral, and wherein when the RF signal has an H-plane, it passes through the conversion tube and is converted into an E-plane, and when the RF signal has an E-plane, it passes through the conversion tube and is converted into an H-plane.

7. The device for transmitting an RF signal of claim 6, wherein the transverse section of the conversion tube has a shape in which two squares are partially overlapped in a diagonal direction.

8. The device for transmitting an RF signal of claim 6, wherein the transverse section of the first waveguide and the transverse section of the second waveguide are arranged within the quadrilateral, occupying a portion of each of two corners not occupied by the transverse section of the conversion tube.

9. The device for transmitting an RF signal of claim 8, wherein in the two corners not occupied by the transverse section of the conversion tube within the quadrilateral, a non-occupied region not occupied by the transverse section of the first waveguide and the transverse section of the second waveguide is formed in a square shape.

10. The device for transmitting an RF signal of claim 8,
wherein the length of the long side of the rectangle is 2.54 mm, and
wherein the length of one side of the square is 1.58 to 1.62 mm.

11. The device for transmitting an RF signal of claim 10, wherein the length in the extension direction of the conversion tube is 1.05 to 1.55 mm.

12. The device for transmitting an RF signal of claim 8,
wherein the length of the long side of the rectangle is 3.1 mm, and
wherein the length of one side of the square is 1.91 to 1.95 mm.

13. The device for transmitting an RF signal of claim 12, wherein the length in the extension direction of the conversion tube is 1.63 to 2.43 mm.

* * * * *